United States Patent
Hilgendorff

(10) Patent No.: US 9,242,242 B2
(45) Date of Patent: Jan. 26, 2016

(54) CATALYST FOR GASOLINE LEAN BURN ENGINES WITH IMPROVED NO OXIDATION ACTIVITY

(75) Inventor: Marcus Hilgendorff, Hannover (DE)

(73) Assignee: BASF SE, Ludwigshafen (DE)

( * ) Notice: Subject to any disclaimer, the term of this patent is extended or adjusted under 35 U.S.C. 154(b) by 249 days.

(21) Appl. No.: 13/224,665

(22) Filed: Sep. 2, 2011

(65) Prior Publication Data
US 2012/0055141 A1 Mar. 8, 2012

Related U.S. Application Data

(60) Provisional application No. 61/379,400, filed on Sep. 2, 2010.

(51) Int. Cl.
*F01N 3/00* (2006.01)
*B01J 37/02* (2006.01)
(Continued)

(52) U.S. Cl.
CPC ......... *B01J 37/0244* (2013.01); *B01D 53/9477* (2013.01); *B01J 23/58* (2013.01); *B01J 23/63* (2013.01); *B01J 35/023* (2013.01); *B01J 37/0203* (2013.01); *B01J 37/0248* (2013.01); *B01D 53/9418* (2013.01); *B01D 53/9422* (2013.01); *B01D 2255/1021* (2013.01); *B01D 2255/1023* (2013.01); *B01D 2255/1025* (2013.01); *B01D 2255/202* (2013.01); *B01D 2255/2042* (2013.01);
(Continued)

(58) Field of Classification Search
USPC ........................... 60/274, 282, 299, 301, 311; 502/100–103, 300, 306, 313, 317, 339; 423/402, 437.1
See application file for complete search history.

(56) References Cited

U.S. PATENT DOCUMENTS 4,961,917 A 10/1990 Byrne
5,001,103 A * 3/1991 Koberstein et al. ........... 502/262
(Continued)

FOREIGN PATENT DOCUMENTS

CN 1119127 3/1996
CN 101015801 8/2007
(Continued)

OTHER PUBLICATIONS

"International Search Report of PCT/IB2011/053847", mailed on Jan. 5, 2012, 6 pages.
(Continued)

Primary Examiner — Jesse Bogue
(74) Attorney, Agent, or Firm — Servilla Whitney LLC

(57) ABSTRACT

Described is a catalyst comprising a substrate and a catalyst coating of two or more layers: (a) a first layer comprising Pt and/or Pd on the substrate; and (b) a second layer comprising Pt on the first layer; these layers each further comprising: one or more particulate support materials; one or more oxygen storage component (OSC) materials; and one or more nitrogen oxide storage materials comprising one or more elements selected from the group of alkali and/or alkaline earth metals, wherein the total amount of alkali and alkaline earth metals ranges from 0.18 to 2.5 g/in$^3$ calculated as the respective alkali metal oxides $M_2O$ and alkaline earth metal oxides MO. Also described is a method for the production of a catalyst, as well as a process for the treatment of a gas stream comprising nitrogen oxide, in particular of an exhaust gas stream resulting from an internal combustion engine.

20 Claims, 4 Drawing Sheets

(51) Int. Cl.

| | |
|---|---|
| *B01J 23/58* | (2006.01) |
| *B01J 23/63* | (2006.01) |
| *B01J 35/02* | (2006.01) |
| *B01D 53/94* | (2006.01) |
| *B01J 37/00* | (2006.01) |
| *F01N 3/035* | (2006.01) |
| *F01N 3/08* | (2006.01) |
| *F01N 3/20* | (2006.01) |

(52) U.S. Cl.
CPC ............... *B01D 2255/2047* (2013.01); *B01D 2255/2063* (2013.01); *B01D 2255/2065* (2013.01); *B01D 2255/20715* (2013.01); *B01D 2255/908* (2013.01); *B01D 2255/9025* (2013.01); *B01D 2255/91* (2013.01); *B01D 2257/404* (2013.01); *B01D 2258/012* (2013.01); *B01J 37/0036* (2013.01); *F01N 3/035* (2013.01); *F01N 3/0814* (2013.01); *F01N 3/0821* (2013.01); *F01N 3/0842* (2013.01); *F01N 3/0864* (2013.01); *F01N 3/2066* (2013.01); *F01N 2510/0684* (2013.01); *Y02T 10/24* (2013.01)

(56) References Cited

U.S. PATENT DOCUMENTS

| | | | |
|---|---|---|---|
| 5,516,497 A | 5/1996 | Speronello et al. | |
| 6,080,375 A | 6/2000 | Mussmann et al. | |
| 6,345,496 B1 * | 2/2002 | Fuwa et al. | 60/274 |
| 6,858,193 B2 | 2/2005 | Ruwisch et al. | |
| 7,407,911 B2 | 8/2008 | Yeo et al. | |
| 2007/0028601 A1 * | 2/2007 | Duvinage et al. | 60/286 |
| 2007/0125072 A1 * | 6/2007 | McCarthy et al. | 60/286 |
| 2007/0269353 A1 * | 11/2007 | Li et al. | 422/176 |
| 2008/0044330 A1 * | 2/2008 | Chen et al. | 423/213.5 |
| 2008/0045404 A1 * | 2/2008 | Han et al. | 502/66 |
| 2008/0045405 A1 | 2/2008 | Beutel et al. | |
| 2008/0226514 A1 * | 9/2008 | Chen et al. | 422/168 |
| 2009/0041645 A1 * | 2/2009 | Wassermann et al. | 423/213.5 |
| 2009/0158719 A1 * | 6/2009 | Hallstrom et al. | 60/297 |
| 2010/0077734 A1 * | 4/2010 | Shamis et al. | 60/286 |
| 2010/0242934 A1 * | 9/2010 | Yonekawa et al. | 123/672 |
| 2011/0120093 A1 | 5/2011 | Eckhoff et al. | |
| 2013/0061576 A1 * | 3/2013 | Gonze et al. | 60/286 |

FOREIGN PATENT DOCUMENTS

| | | |
|---|---|---|
| DE | 10011612 | 10/2000 |
| DE | 10152187 | 4/2003 |
| EP | 2112339 | 10/2009 |
| WO | WO-2008/022751 | 2/2008 |
| WO | WO-2008/097702 | 8/2008 |
| WO | WO-2009/134831 | 11/2009 |

OTHER PUBLICATIONS

"IPRP in PCT/IB2011/053847", dated Mar. 5, 2013, 6 pgs.

* cited by examiner

CATALYST FOR GASOLINE LEAN BURN ENGINES WITH IMPROVED NO OXIDATION ACTIVITY

CROSS-REFERENCE TO RELATED APPLICATIONS

This application claims priority under 35 U.S.C. §119(e) to U.S. Provisional Application No. 61/379,400, filed Sep. 2, 2010, the disclosures of which are incorporated herein by reference in their entirety.

TECHNICAL FIELD

The present invention relates to a catalyst with improved NO oxidation activity, as well as to a method for the treatment of automobile exhaust gas and to a treatment system for an automobile exhaust gas stream. In particular, the present invention relates to a three-way catalyst (TWC) which may be used in conjunction with a selective catalytic reduction (SCR) catalyst.

BACKGROUND

One of the problems encountered in the treatment of automotive exhaust gas, and in particular, exhaust gas from lean burn engine such as diesel exhaust gas and lean burn gasoline engines, concerns the treatment of nitrous oxides contained therein. To this effect, many exhaust gas treatment systems employed in automotive vehicles running under lean burn conditions incorporate a combination of a NOx storage catalyst located upstream of an SCR catalyst. In particular, nitrogen oxide contained in an exhaust gas stream is stored at lower temperatures in the NOx storage catalyst, to be released at higher operation temperature at which an effective reduction thereof in the SCR unit may be achieved. To this extent, it is usually necessary to employ a means of injecting a reducing agent into the gas stream downstream of the NOx storage catalyst and before the SCR unit for enabling the SCR reaction of nitrogen oxide to nitrogen. For achieving an optimal SCR activity, i.e. for keeping emissions of nitrogen oxides and/or of reducing agents such as ammonia and/or urea as low as possible, numerous solutions have been proposed to coordinate the activities of the individual components of an NOx storage catalyst, a reducing agent injection means located downstream thereof, and an SCR unit for reaction of the reducing agent and the nitrogen oxide under ideal stoichiometry depending on the inlet temperature.

DE 100 11 612 A1, for example, discloses an exhaust gas treatment system for combustion engines containing a sequence of an NOx storage catalyst, a urea injection unit, and an SCR catalyst provided in the exhaust gas conduit, wherein a system of sensors regulate the injection of urea depending on the oxygen content of the exhaust gas. WO 2008/022751, on the other hand, discloses an exhaust gas treatment system having the same sequence of components, wherein the infection of ammonia upstream of the SCR unit is specifically controlled in dependency of the exhaust gas inlet temperature.

US 2008/0045405 discloses an exhaust gas treatment system for a diesel engine, wherein a sequence of a diesel oxidation catalyst, a catalyzed soot filter, and an SCR unit are provided in that order in the exhaust gas conduit. As an improvement to said arrangement of the components, EP 2 112 339 discloses the inversion of the sequence of the catalyzed soot filter and the diesel oxidation catalyst, as a result of which a better control of the NO$_2$/NOx-ratio may be achieved for the subsequent reaction in the SCR unit.

In the exhaust gas systems for the treatment of nitrogen oxides, and in particular, for the treatment of nitrogen oxides in exhaust gas from lean burn systems at air to fuel ratios of 20 to 1 or higher, the problem exists that the coordination of the hydrocarbon (HC) oxidation activity and of the NO oxidation activities remains poor after aging (i.e. after a durability test). In particular, for gasoline lean burn engines usually temperatures of >900° C. at lean and rich exhaust gas conditions occur during driving at higher speeds. These conditions usually lead to a very strong sintering of Pt, Pd or Pt/Pd alloys. This sintering process is accompanied by a strong loss of catalytic activity for hydrocarbon oxidation and in particular NO oxidation at state of the art TWC converters. However a high catalytic activity for NO oxidation is required for optimal conversion of the resulting gas mixture in a downstream SCR unit.

SUMMARY

According to one or more embodiments, provided is a catalyst with improved nitrogen oxide and hydrocarbon oxidation activity, in particular for use in an exhaust gas treatment system of lean burn engine applications.

DESCRIPTION

It has surprisingly been found that a catalyst according to the present invention provides an activity towards NO oxidation which is greatly improved without impeding the catalyst's ability to also oxidize hydrocarbons. As a result of this, when employed for the treatment of exhaust gas containing NO, an improved level of NO$_2$ may be achieved which is highly advantageous with respect to subsequent treatment of the exhaust gas in an SCR process. This applies in particular with respect to the following reaction process occurring in a subsequent SCR unit:

$$NO+NO_2+2NH_3 \rightarrow 2N_2+3H_2O$$

wherein the stoichiometry for said reaction may be optimized by using the inventive catalyst under the given reaction conditions, yet without impeding the catalyst's ability to afford a high level of hydrocarbon oxidation, on particular with respect to the formation of carbon dioxide.

Thus, certain embodiments of the present invention relate to a catalyst comprising a substrate and a catalyst coating, the catalyst coating comprising two or more layers, said layers comprising:

(a) a first layer provided on the substrate, said first layer comprising Pt and/or Pd, preferably Pt and Pd; and (b) a second layer provided on the first layer, said second layer comprising Pt; the first and second layers each further comprising:

one or more particulate support materials, wherein preferably at least part of the one or more platinum group metals is supported on the one or more particulate support materials;

one or more oxygen storage component (OSC) materials; and one or more nitrogen oxide storage materials comprising one or more elements selected from the group of alkali and/or alkaline earth metals, wherein the total amount of alkali and alkaline earth metals comprised in the one or more nitrogen oxide storage materials contained in the catalyst ranges from 0.18 to 2.5 g/in$^3$ calculated as the respective alkali metal oxides M$_2$O and alkaline earth metal oxides MO, preferably from 0.2 to 2.0 g/in$^3$, more preferably from 0.4 to 1.5 g/in$^3$, more preferably from 0.5 to 1.3 g/in$^3$, and even more preferably from 0.6 to 1.2 g/in$^3$.

Within the meaning of the present invention, unless stated otherwise, the term "nitrogen oxide storage material" and in particular "one or more nitrogen oxide storage materials" preferably refers to the nitrogen oxide storage material and to the one or more nitrogen oxide storage materials, respectively, wherein said material or materials comprise one or more elements selected from the group of alkali and/or alkaline earth metals according to the embodiments and preferred embodiments of said nitrogen oxide storage material or one or more nitrogen oxide storage materials as defined in the present invention.

As the substrate, any material may be used provided that it may support the layers of the catalyst and that it is resistant to the conditions which reign during the exhaust gas treatment process. The substrate according to the present invention may be of any conceivable shape, provided that it allows for the fluid contact with at least a portion of the layers present thereon. Preferably, the substrate is a monolith, wherein more preferably the monolith is a flow-through monolith. Suitable substrates include any of those materials typically used for preparing catalysts, and will usually comprise a ceramic or metal honeycomb structure. Accordingly, the monolithic substrate contains fine, parallel gas flow passages extending from an inlet to an outlet face of the substrate, such that passages are open to fluid flow (referred to as honeycomb flow through substrates). The passages, which are essentially straight paths from their fluid inlet to their fluid outlet, are defined by walls on which the layers are disposed, so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, or circular. Such structures may contain up to 900 gas inlet openings (i.e., cells) per square inch of cross section, wherein according to the present invention structures preferably have from 50 to 600 openings per square inch, more preferably from 300 to 500, and even more preferably from 350 to 400.

Thus, according to a preferred embodiment of the present invention, the catalyst comprises a substrate which is a monolith, preferably a flow-through monolith, more preferably a flow-through monolith having a honeycomb-structure.

In general, the substrate can be made from materials commonly known in the art. For this purpose, porous materials are preferably used as the substrate material, in particular ceramic and ceramic-like materials such as cordierite, $\alpha$-alumina, an aluminosilicate, cordierite-alumina, silicon carbide, aluminum titanate, silicon nitride, zirconia, mullite, zircon, zircon mullite, zircon silicate, sillimanite, a magnesium silicate, petalite, spodumene, alumina-silica-magnesia and zirconium silicate, as well as porous refractory metals and oxides thereof. According to the present invention, "refractory metal" refers to one or more metals selected from the group consisting of Ti, Zr, Hf, V, Nb, Ta, Cr, Mo, W, and Re. The substrate may also be formed of ceramic fiber composite materials. According to the present invention, the substrate is preferably formed from cordierite, silicon carbide, and/or from aluminum titanate. In general, materials are preferred which are able to withstand the high temperatures to which a catalyst is exposed to, in particular when used in the treatment of automotive exhaust gas. Furthermore, it will be understood that the loading of the catalytic composition on a wall flow substrate will depend on substrate properties such as porosity and wall thickness.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt.-% of the alloy, e.g., 10-25 wt.-% of chromium, 3-8 wt.-% of aluminum and up to 20 wt.-% of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the subsequent adherence of the compositions to the substrate.

According to one or more embodiments of the present invention, the first and second layers comprise one or more oxygen storage component (OSC) materials. In principle, any oxygen storage component material may be used, provided that it may reversibly store oxygen. Preferably, said oxygen storage component material comprises one or more compounds selected from the group consisting of zirconia, rare earth metals, and mixtures thereof, more preferably from the group consisting of zirconia, ceria, lanthana, praseodymia, neodymia, yttria, and mixtures thereof, wherein the one or more OSC materials preferably comprise ceria and/or zirconia. According to particularly preferred embodiments, the OSC material comprises both ceria and zirconia, wherein ceria is preferably doped with La and/or Zr, more preferably with both La and Zr.

In preferred embodiments of the present invention comprising ceria doped with La, it is further preferred that ceria is doped with from 1 to 20% of La, more preferably with from 2 to 10%, more preferably with from 3 to 8%, and even more preferably with from 4 to 6% of La, based on 100% of the doped ceria. Furthermore, in preferred embodiments of the present invention comprising ceria doped with Zr, it is further preferred that ceria is doped with from from 1 to 20% of Zr, more preferably with from 2 to 10%, more preferably with from 3 to 8%, and even more preferably with from 4 to 6% of Zr, based on 100% of the doped ceria.

According to particularly preferred embodiments of the present invention comprising ceria doped with both La and Zr, it is further preferred that ceria is doped with from 1 to 20% of La and Zr, respectively, more preferably with from 2 to 10%, more preferably with from 3 to 8%, and even more preferably with from 4 to 6% of La and Zr, respectively, based on 100% of the doped ceria.

According to further embodiments of the present invention which are preferred, the OSC material comprises both ceria and zirconia which form a solid solution. This solid solution of ceria and zirconia is preferably doped with Pr and/or Nd, more preferably with both Pr and Nd.

In preferred embodiments of the present invention comprising a ceria-zirconia mixed oxide doped with Nd, it is further preferred that ceria is doped with from 1 to 20% of Nd, more preferably with from 2 to 15%, more preferably with from 3 to 10%, and even more preferably with from 5 to 8% of Nd, based on 100% of the doped ceria. Furthermore, in preferred embodiments of the present invention comprising a ceria-zirconia mixed oxide doped with Pr, it is further preferred that ceria is doped with from 1 to 20% of Pr, more preferably with from 2 to 15%, more preferably with from 3 to 10%, and even more preferably with from 5 to 8% of Pr, based on 100% of the doped ceria-zirconia mixed oxide.

According to particularly preferred embodiments of the present invention comprising a ceria-zirconia mixed oxide doped with both Nd and Pr, it is further preferred that said ceria-zirconia mixed oxide is doped with from 1 to 20% of Nd and Pr, respectively, more preferably with from 2 to 15%, more preferably with from 3 to 10%, and even more preferably with from 5 to 8% of Pr and Nd, respectively, based on 100% of the doped ceria.

Within the meaning of the present invention, values expressed in % generally refer to wt.-% unless specified otherwise. Furthermore, the term "comprising" as employed in the present invention generally indicates that a component is contained in a specific component, without however excluding the presence of further materials or compounds in said component. According to a preferred meaning of the present invention, however, the term "comprising" is used in the sense of "consisting of", such that the presence of further components than those specifically designated is excluded.

According to the present invention, the one or more OSC materials comprised in the first and second layers of the catalyst coating may be the same or different from one another. According to preferred embodiments, the first and second layers both contain one or more OSC materials comprising ceria doped with La and Zr, wherein more preferably only the second layer contains one or more OSC materials comprising ceria doped with La and Zr.

According to further embodiments of the present invention which are preferred, the first and second layers both contain one or more OSC materials comprising a ceria-zirconia mixed oxide doped with Pr and Nd, wherein more preferably only the second layer contains one or more OSC materials comprising a ceria-zirconia mixed oxide doped with Pr and Nd.

In principle, any possible loading of the one or more OSC materials may be chosen in the catalyst, provided that a sufficient level of oxygen storage is provided, and that the oxygen storage capacity of the catalyst does not interfere with its capacity to provide both a high level of NO and HC oxidation activity. In general, the total loading of the one or more OSC materials contained in the catalyst may range from 0.5 to 4.5 $g/in^3$, wherein loadings are preferred which range from 1.0 to 3.8 $g/in^3$, more preferably from 1.5 to 3.3 $g/in^3$, more preferably 2.0 to 2.8 $g/in^3$, and even more preferably from 2.1 to 2.7 $g/in^3$. According to the present invention, the loading of the one or more OSC materials specifically contained in the first layer may range from 0.2 to 3.5 $g/in^3$, wherein preferably the loading ranges from 0.5 to 3.0 $g/in^3$, more preferably 1.0 to 2.6 $g/in^3$, 1.2 to 2.4 $g/in^3$, and even more preferably from 1.5 to 2.1 $g/in^3$. Furthermore or alternatively, the loading of the one or more OSC materials specifically contained in the second layer may range from 0.1 to 10 $g/in^3$, wherein loadings are preferred which range from 0.3 to 0.9 $g/in^3$, more preferably from 0.4 to 0.8 $g/in^3$, and even more preferably from 0.5 to 0.7 $g/in^3$.

According to one or more embodiments of the present invention, the first layer in the catalyst coating comprises Pt and/or Pd, and preferably both Pt and Pd. Furthermore, the second layer in the catalyst coating comprises Pt. In principle, any conceivable loading of these platinum group metals may be contained in the catalyst coating and, preferably, in the first and second layers contained therein. Thus, the catalyst may comprise Pt in a loading of from 5 to 180 $g/ft^3$, wherein the loading of Pt in the catalyst preferably ranges from 10 to 140 $g/ft^3$, more preferably from 30 to 120 $g/ft^3$, more preferably from 45 to 110 $g/ft^3$, and even more preferably from 55 to 105 $g/ft^3$. Furthermore of alternatively, the catalyst may comprise Pd in a loading of from 0.5 to 18 $g/ft^3$, wherein the loading of Pd in the catalyst preferably ranges from 1 to 14 $g/ft^3$, more preferably from 3 to 12 $g/ft^3$, more preferably from 4.5 to 11 $g/ft^3$, and even more preferably from 5.5 to 10.5 $g/ft^3$.

In general, the loading with these platinum group metals refers to their content in the catalyst, wherein these platinum group metals are preferably contained in the catalyst coating, and more preferably in the first and second layers comprised in said coating, to the content of which the loadings preferably refer to, respectively. According to preferred embodiments of the present invention wherein Pt is comprised in the first layer, preferably in addition to Pd, the loading of Pt in said layer may range from 1 to 150 $g/ft^3$, and preferably ranges from 10 to 100 $g/ft^3$, more preferably from 20 to 80 $g/ft^3$, more preferably from 25 to 70 $g/ft^3$, more preferably from 30 to 65 $g/ft^3$, and even more preferably from 35 to 59 $g/ft^3$. Furthermore or alternatively, the loading of Pt comprised in the second layer may range from 1 to 100 $g/ft^3$, and preferably ranges from 5 to 80 $g/ft^3$, more preferably from 10 to 60 $g/ft^3$, more preferably from 15 to 50 $g/ft^3$, more preferably from 20 to 45 $g/ft^3$, and even more preferably from 25 to 42 $g/ft^3$.

According to the present invention, there is generally no restriction with respect to the presence of further platinum group metals in the catalyst, provided that said metals do not hinder the catalyst's ability to treat exhaust gas and in particular to provide a high level of both HC and NO oxidation activity. Within the meaning of the present invention, unless explicitly stated otherwise, the term "platinum group metals" refers to the elements Ru, Rh, Pd, Os, Ir, and Pt.

With respect to the particular content of Rh in the catalyst, it may be contained in the catalyst of the present invention in any suitable amount, provided that it does not hinder the catalysts ability to provide a high level of both HC an NO oxidation activity. In general, Rh may for example be contained in the catalyst in an amount of up to 50 $g/ft^3$, wherein it is preferred that Rh be contained in the catalyst in an amount of 30 $g/ft^3$ or less, preferably of 20 $g/ft^3$ or less, more preferably of 15 $g/ft^3$ or less, more preferably of 10 $g/ft^3$ or less, more preferably of 5 $g/ft^3$ or less, more preferably of 1 $g/ft^3$ or less, and wherein even more preferably the catalyst contains less than 500 ppm of Rh According to particular embodiments of the present invention, it is preferred that the first layer comprises less than 500 ppm of Rh, and more preferably less than 500 ppm of further platinum group metal besides Pt and/or Pd, and even more preferably besides both Pt and Pd. According to said preferred embodiments, it is further preferred that the first layer contains less than 50 ppm thereof, more preferably less than 10 ppm, more preferably less than 1 ppm, and even more preferably less than 0.1 ppm thereof. Furthermore or alternatively, it is preferred according to the present invention that the second layer comprises less than 500 ppm of Rh, and more preferably less than 500 ppm of Rh and Pd, and even more preferably less than 500 ppm of further platinum group metal besides Pt. Again, according to said preferred embodiments, it is further preferred that the first layer contains less than 50 ppm thereof, more preferably less than 10 ppm, more preferably less than 1 ppm, and even more preferably less than 0.1 ppm thereof.

According to particularly preferred embodiments, it is preferred that the catalyst contains less than 500 ppm of Rh, and preferably less than 50 ppm, more preferably less than 10 ppm, more preferably less than 1 ppm, and even more preferably less than 0.1 ppm of Rh. According to particularly preferred embodiments, the catalyst contains less than 500 ppm of platinum group metals other than those comprised in the first and second layers of the catalyst coating, preferably less than 500 ppm of further platinum group metals besides Pt and Pd, wherein more preferably the catalyst contains less than 50 ppm of said further platinum group metals, more preferably less than 10 ppm, more preferably less than 1 ppm, and even more preferably less than 0.1 ppm of said further platinum group metals.

Therefore, embodiments of the present invention are preferred, wherein the first layer comprises less than 500 ppm of Rh, more preferably less than 500 ppm of further platinum group metal besides Pt and/or Pd, preferably Pt and Pd, and/or, preferably and, wherein the second layer comprises less than 500 ppm of Rh, more preferably less than 500 ppm of Rh and Pd, more preferably less than 500 ppm of further platinum group metal besides Pt, wherein it is even more preferred that the content of said one or more metals is respectively less than 50 ppm, more preferably less than 10 ppm, more preferably less than 1 ppm, and even more preferably less than 0.1 ppm.

In general, according to present invention, in embodiments of the catalyst comprising both Pt and Pd, there is no particular restriction as to the weight ratio of Pt to Pd contained therein. It is noted that, unless specified otherwise, ratios of elements and/or compounds according to the present invention generally refers to the weight ratios thereof. Thus, the Pt:Pd weight ratio in the catalyst may range anywhere from 1:10 to 100:1, wherein the weight ratio is preferably comprised in the range of from 1:5 to 70:1, more preferably of from 1:2 to 50:1, more preferably of from 1:1 to 30:1, more preferably of from 2:1 to 20:1, more preferably of from 5:1 to 15:1, and even more preferably of from 6:1 to 11:1. Furthermore or alternatively, with respect to the weight ratio of Pt and Pd specifically contained in the first layer of the catalyst, it is preferred that the Pt:Pd weight ratio ranges from 1:2 to 50:1, and more preferably from 1:1 to 20:1, more preferably from 2:1 to 15:1, more preferably from 3:1 to 10:1, and even more preferably from 4:1 to 7:1.

In general, the platinum group metal components of the catalyst, and in particular Pt and Pd, may be contained therein in any suitable form and fashion, provided that the catalyst displays a high level of HG and NO oxidation activity in the treatment of exhaust gas. Thus, the platinum group metal components may be contained therein as such and/or may be supported on one or more of the catalyst components, preferably on one or more of the further components contained in the first and second layers of the catalyst coating. The platinum group metal components may therefore at least in part or entirely be supported any one of the one or more particulate support materials, of the one or more OSC materials, and/or on one or more of the nitrogen oxide storage materials. It is noted herewith, that the term "nitrogen oxide" as used in the present invention generally refers to binary compounds of nitrogen and oxygen, and preferably to NO, $NO_2$, and $N_2O$, and even more preferably to NO and $NO_2$. Furthermore, within the meaning of the present invention, the term "$NO_x$" refers to the compounds NO and $NO_2$.

In preferred embodiments of the catalyst according to the present invention, the platinum group metals and in particular Pt and/or Pd are at least in part and preferably entirely supported on one or more particulate support materials. In embodiments wherein more than one platinum group metal and in particular Pt and Pd are both contained in the first and/or second layers of the catalyst coating, and preferably wherein Pt and Pd are both contained in the first layer of the catalyst coating, said platinum group metals may be supported on the same or on different particulate support materials. Alternatively, the platinum group metals may only in part be supported on the same particulate support material in the first and/or second layer, wherein one or more of the platinum group metals are also separately supported on the one or more particulate support materials and/or on one or more further components contained in the first and/or second layer.

In general, any conceivable particulate support material may be contained in the catalyst, provided that it may withstand the conditions encountered in exhaust gas treatment processes, and that it may suitably support one or more further catalyst components and in particular one or more platinum group metals, preferably Pd and/or Pt. According to preferred embodiments, the particulate support material comprises one or more oxides and more preferably one or more metal oxides. Preferably, high surface area refractory metal oxide supports such as alumina support materials, also referred to as "gamma alumina" or "activated alumina," are used. Said materials typically exhibit a BET surface area ranging from 60 to 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption. Pore diameter and pore volume can also be determined using BET-type $N_2$ adsorption. Preferably, the active alumina has a specific surface area comprised in the range of from 60 to 350 $m^2/g$, and typically 90 to 250 $m^2/g$.

According to preferred embodiments of the present invention, the metal oxide, and in particular the metal oxide support particles, preferably contained in the one or more particulate support materials preferably comprises at least one compound selected from the group consisting of alumina, titania, titania-alumina, zirconia-alumina, baria-alumina, ceria-alumina, baria-ceria-alumina, lanthana-alumina, lanthana-zirconia-alumina, titania-zirconia, and mixtures thereof. It is further preferred that the at least one compound is selected from the group consisting of alumina, zirconia-alumina, lanthana-alumina, lanthana-zirconia-alumina, and mixtures thereof, more preferably from the group consisting of zirconia-alumina, lanthana-alumina, lanthana-zirconia-alumina, and mixtures thereof, wherein even more preferably the one or more particulate support materials comprise lanthana-zirconia-alumina.

According to particularly preferred embodiments the one or more metal oxides, and in particular the metal oxide support particles comprised in the one or more particulate support materials, are doped with one or more compounds. Thus, the metal oxide and preferably alumina may be preferably doped with one or more compounds, preferably with lanthana and/or zirconia, and more preferably with both lanthana and zirconia. In said embodiments, there is no specific restriction as to the amount of the one or more compounds with which the metal oxide particles are doped. Thus, the metal oxide and preferably alumina may be doped with 50% or less of one or more compounds, preferably with 40% or less, more preferably 30% or less, more preferably 25% or less, more preferably 20% or less, and even more preferably 16% or less. According to particularly preferred embodiments comprising alumina doped with lanthana, it is preferred that alumina is doped with lanthana in the range of from 0.05 to 5%, preferably of from 0.1 to 2%, more preferably of from 0.2 to 1%, and even more preferably of from 0.3 to 0.5%. Furthermore or alternatively, according to particularly preferred embodiments comprising alumina doped with zirconia, it is preferred that alumina is doped with zirconia in the range of from 1 to 50%, preferably of from 5 to 30%, more preferably of from 10 to 20%, more preferably of from 12 to 18%, and even more preferably of from 14 to 16%. Particularly preferred are embodiments comprising alumina doped with both lanthana and zirconia, wherein the alumina is doped with zirconia in the range of from 1 to 50%, preferably of from 5 to 30%, more preferably of from 10 to 20%, more preferably of from 12 to 18%, and even more preferably of from 14 to 16%, and wherein the alumina is further doped with lanthana in the range of from 0.05 to 5%, preferably of from 0.1 to 2%, more preferably of from 0.2 to 1%, and even more preferably of from 0.3 to 0.5%.

In general, the catalyst may comprise any suitable amount of the one or more particulate support materials, provided that the technical features of the catalyst may be provided, in particular with respect to a high level of NO and HC oxidation activity. Thus, the loading of the catalyst with one or more particulate support materials may range from 0.5 to 7.0 $g/in^3$, and preferably ranges from 1.5 to 4.5 $g/in^3$, more preferably from 2.0 to 3.8 $g/in^3$, more preferably from 2.2 to 3.5 $g/in^3$, and even more preferably from 2.5 to 3.3 $g/in^3$. According to preferred embodiments thereof, the loading of the one or more particulate support materials in the first layer of the catalyst coating ranges from 0.5 to 5.0 $g/in^3$, more preferably from 1.0 to 3.0 $g/in^3$, more preferably from 1.2 to 2.5 $g/in^3$, and even more preferably from 1.4 to 2.2 $g/in^3$. Furthermore of alternatively, the loading of the one or more particulate support materials in the second layer preferably ranges from 0.1 to 3.0 $g/in^3$, more preferably from 0.5 to 2.0 $g/in^3$, more preferably from 0.8 to 1.4 $g/in^3$, and even more preferably from 1.0 to 1.2 $g/in^3$.

In one or more embodiments of the present invention, the first and second layers of the catalyst coating comprise one or more nitrogen oxide storage materials comprising one or more elements selected from the group of alkali and/or alkaline earth metals. In principle any element or combination of elements selected from the group of alkali and/or alkaline earth metals may be contained in the catalyst according to the present invention, provided that the technical effects of the present invention and in particular the high level of HC and NO oxidation activity is provided by the catalyst. According to the present invention, the one or more alkali and/or alkaline earth metals contained in the nitrogen oxide storage material is preferably selected from the group consisting of Li, Na, K, Rb, Cs, Mg, Ca, Sr, and Ba, and more preferably from the group consisting of K, Mg, Sr, and Ba. According to particularly preferred embodiments, the one or more alkali and/or alkaline earth metals is selected from the group consisting of K, Mg, and Ba, wherein more preferably the one or more nitrogen oxide storage materials comprise Mg and/or Ba, even more preferably Ba.

In general, the one or more alkali and/or alkaline earth metals contained in the nitrogen oxide storage material may be contained in any suitable form, provided that the catalyst is capable of reversibly fixing nitrogen oxide. Preferably, the one or more alkali and/or alkaline earth metals are contained as their respective oxides and/or as their respective carbonates. According to a particularly preferred embodiment, the one or more alkali and/or alkaline earth metals are at least partly contained, and preferably entirely contained, as their respective carbonates.

Concerning the nitrogen oxide storage material comprised in the first and second layers of the catalyst coating, any conceivable element or compound may also be used in addition to said one or more elements selected from the group of alkali and/or alkaline earth metals, provided that said element or compound is capable of reversibly fixing nitrogen oxide. In particular the nitrogen oxide storage material is chosen such that it is capable of binding nitrogen oxide at lower temperatures and subsequently releasing it at higher temperatures, in particular at temperatures at which effective catalytic conversion thereof may be achieved. More specifically, lower temperatures as used in the present context refer to those encountered in automotive exhaust gas purification during cold start conditions, prior to which the engine is at most at ambient temperature. Higher temperatures, on the other hand, refer to those temperatures encountered when the exhaust gas system has attained a temperature at which it is fully operative with respect to exhaust gas treatment, in particular with respect to the conversion efficiency of nitrogen oxide emissions.

Within the meaning of the present invention, it is noted that the term "conversion" is used in the sense that it encompasses both the chemical conversion of emissions to other compounds, as well as the trapping of emissions by chemical and/or adsorptive binding to an appropriate trapping material. This applies in particular to the cold start periods in the treatment of automotive exhaust gas, since the effective trapping of emissions ideally has the effect of temporarily storing them until efficient conversion thereof may be achieved in the hotter phases of exhaust gas treatment. "Emissions" as used in the context of the present invention preferably refers to exhaust gas emissions, more preferably to exhaust gas emissions comprising NOx, CO, and hydrocarbons, and even more preferably to NOx, CO, and hydrocarbons comprised in automotive exhaust gas.

According to the present invention, nitrogen oxide storage materials are preferred which in addition to the one or more elements selected from the group of alkali and/or alkaline earth metals further comprise at least one metal compound selected from the group of rare earth metal compounds, and in particular the respective oxides thereof, preferably from the group consisting of Ce, La, Pr, Nd, and mixtures thereof, wherein the further element further comprised in the one or more nitrogen oxide storage materials is preferably Ce, preferably as ceria.

In principle, any conceivable loading of the nitrogen oxide storage material may be chosen, provided that a sufficient amount of nitrogen oxide may be stored, and that the function of the remaining components comprised in the NOx storage catalyst is not impaired. In general, the loading of the total loading of the nitrogen oxide storage material in the catalyst may range from 0.18 to 7 $g/in^3$, preferably from 0.2 to 5 $g/in^3$, more preferably from 0.5 to 4.5 $g/in^3$, more preferably from 1.0 to 4.0 $g/in^3$, more preferably from 2.0 to 3.7 $g/in^3$, and even more preferably from 2.5 to 3.5 $g/in^3$. According to preferred embodiments thereof, the loading of the nitrogen oxide storage material in the first layer ranges from 0.2 to 7 $g/in^3$, more preferably from 0.5 to 4.5 $g/in^3$, more preferably from 1.0 to 3.5 $g/in^3$, more preferably from 1.6 to 3.0 $g/in^3$, and even more preferably from 1.9 to 2.7 $g/in^3$. Furthermore or alternatively, the loading or the nitrogen oxide storage material in the second layer preferably ranges from 0.05 to 3.0 $g/in^3$, more preferably from 0.1 to 2.0 $g/in^3$, more preferably from 0.3 to 1.5 g/in$^3$, more preferably from 0.5 to 1.0 g/in$^3$, and even more preferably from 0.6 to 0.8 g/in$^3$.

With respect to particularly preferred embodiments of the present invention wherein Ba is comprised in the one or more nitrogen oxide storages materials, Ba is preferably contained in the catalyst in an amount ranging from 0.18 to 2.0 g/in$^3$ calculated as BaO, and more preferably in an amount ranging from 0.20 to 1.5 g/in$^3$, more preferably from 0.23 to 1.3 g/in$^3$, more preferably from 0.25 to 1.0 g/in$^3$, more preferably from 0.27 to 0.80 g/in$^3$, and even more preferably from 0.28 to 0.72 g/in$^3$. Furthermore or alternatively, in said preferred embodiments of the invention wherein Ba is comprised in the one or more nitrogen oxide storage materials, it is further preferred that the weight ratio of platinum to barium calculated as Pt:BaO be comprised in the range of from 0.01 to 1.0, wherein more preferably said weight ratio is comprised in the range of from 0.05 to 0.5, more preferably of from 0.10 to 0.3, more preferably of from 0.15 to 0.25, and even more preferably of from 0.17 to 0.21.

According to the present invention, it is also particularly preferred that the second layer contains less than 500 ppm of Ba, wherein more preferably, the second layer contains less than 50 ppm of Ba, more preferably less than 10 ppm, more preferably less than 1 ppm, and even more preferably less than 0.1 ppm of Ba. According to embodiments which are further preferred, the second layer contains less than 500 ppm of alkali and/or alkaline earth metals, preferably of alkaline earth metals, wherein more preferably, the second layer contains less than 50 ppm thereof, more preferably less than 10 ppm, more preferably less than 1 ppm, and even more preferably less than 0.1 ppm thereof. According to further embodiments of the present invention which are preferred, the second layer contains less than 500 ppm of nitrogen oxide storage material, preferably less than 50 ppm, more preferably less than 10 ppm, more preferably less than 1 ppm, and even more preferably less than 0.1 ppm.

In the present invention, the catalyst coating and in particular the first and second layers contained therein may be provided in any conceivable manner, provided that the technical effects of the present invention may be achieved, in particular with respect to the high levels of HC and NO oxidation activity. It is however preferred that the first and second layers, and preferably that the catalyst coating containing said layers, is contained in the catalyst as a washcoat layer. As used herein, the term "washcoat" has its usual meaning in the art of a thin, adherent coating of a catalytic or other material applied to a substrate carrier material, such as a honeycomb-type carrier member, which is preferably sufficiently porous to permit the passage there through of the gas stream being treated.

Furthermore, according to the present invention, one or more further layers may be comprised in the catalyst coating in addition to the first and second layers. According to particularly preferred embodiments of the present invention, the first layer itself comprises two or more separate layers, wherein more preferably two separate layers are comprised therein. Said layers may have the same chemical composition, in particular with respect to Pt and/or Pd and preferably Pt and Pd contained therein, as well as with respect to the one or more particulate support materials, the one or more OSC materials, and the one or more nitrogen oxide storage materials respectively contained in said two or more separate layers contained in the first layer of the inventive catalyst or, alternatively, may differ in one or more of said components respectively contained in said two or more separate layers. In particular, within the meaning of the present invention, two or more separate layer comprised in the first layer of the catalyst refers to separate layers which are provided on one another, and wherein the respective chemical composition of said individual layers is a chemical composition according to the embodiments and preferred embodiments of the first layer of the inventive catalyst.

Thus according to preferred embodiments of the catalyst of the present invention, the first layer comprises two or more separate layers, said separate layers being provided on one another.

The catalyst coating and in particular the first and second layers comprised therein may further comprise additives commonly used in the art for providing catalyst coatings such as one or more promoters, one or more stabilizers, or one or more binders. According to preferred embodiments, the catalyst coating comprises one or more binders, wherein the binder preferably comprises aluminum oxyhydrate, preferably in nanoparticular form, and even more preferably wherein the binder comprises boehmite.

According to a preferred embodiment of the present invention, the catalyst is comprised in an exhaust gas treatment system. In particular, the treatment system according to the present invention comprises an internal combustion engine, an exhaust gas conduit in fluid communication with the engine, wherein the catalyst as described herein is provided within the exhaust gas conduit. In principle, any conceivable combustion engine may be used in the treatment system of the present invention, wherein preferably a lean burn engine is used such as a diesel engine or a lean burn gasoline engine, more preferably a lean burn gasoline engine, and even more preferably a gasoline direct injection engine.

Thus, the present invention also relates to an exhaust gas treatment system comprising an internal combustion engine and an exhaust gas conduit in fluid communication with the internal combustion engine, wherein the catalyst is present in the exhaust gas conduit, wherein the internal combustion engine is preferably a gasoline engine, and more preferably a gasoline direct injection engine.

According to particularly preferred embodiments, the exhaust gas treatment system in which the catalyst is comprised contains one or more further components. In particular the exhaust gas treatment system preferably further contains a selective catalytic reduction (SCR) catalyst which located in the exhaust gas conduit, the SCR catalyst preferably being located downstream of the catalyst. Furthermore of alternatively, it is preferred that the exhaust gas treatment system further comprises a means of feeding a reducing agent into the exhaust gas conduit, said means being located between the catalyst and the SCR catalyst. As a reducing agent, any conceivable compound may be used, provided it is suited for reducing nitrogen oxide, in particular in the SCR catalyst, wherein said reducing agent preferably comprises ammonia and/or urea, preferably ammonia.

A suitable SCR catalyst component for use in the exhaust treatment system is one which is able to effectively catalyze the reduction of the NO$_x$ component at temperatures below 600° C., so that adequate NO$_x$ levels can be treated even under conditions of low load which typically are associated with lower exhaust temperatures. Preferably, the catalyst article is capable of converting at least 50% of the NO$_x$ component to N$_2$, depending on the amount of a reductant such as NH$_3$ which is preferably added to the system. In this respect, another desirable attribute for the composition is that it possesses the ability to catalyze the reaction of O$_2$ with any excess NH$_3$ to N$_2$ and H$_2$O, so that NH$_3$ is not emitted to the atmosphere. Useful SCR catalyst compositions used in the emission treatment system should also have thermal resistance to temperatures greater than 650° C.

Suitable SCR catalyst compositions are described, for instance, in U.S. Pat. No. 4,961,917 and U.S. Pat. No. 5,516, 497. Suitable compositions include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations. According to the present invention, it is particularly preferred to use a Cu-containing SCR catalyst in the exhaust gas treatment system in which the catalyst is preferably comprised, and more preferably an SCR catalyst containing Fe in addition to Cu.

The catalyst according to the present invention can be readily prepared by processes well known in the prior art. In particular, the several components of the catalyst material may be applied to the substrate as mixtures of one or more components in sequential steps in a manner which will be readily apparent to those skilled in the art of catalyst manufacture. A typical method of manufacturing the catalyst of the present invention is to respectively provide the one or more platinum group metals, one or more particulate support materials, the one or more oxygen storage component (OSC) materials, and the one or more nitrogen oxide storage materials as a coating or washcoat layer on the walls of the gas-flow passages of a suitable carrier member, wherein the respective components of the first and second layer comprised in the catalyst coating are provided as two or more washcoat layers on the substrate.

According to the present invention, the components of the individual washcoat layers may respectively be processed to a slurry, preferably to an aqueous slurry. The substrate may then be sequentially immersed into the respective slurries for the individual washcoats, after which excess slurry is removed to provide a thin coating of the two or more slurries on the walls of the gas-flow passages of the substrate. The coated substrate is then dried and calcined to provide an adherent coating of the respective component to the walls of the passages. Thus, after providing the first washcoat layer on the substrate, the coated substrate may then be immersed into a further slurry to form the second washcoat layer deposited over the first washcoat layer. The substrate is then dried and/or calcined, wherein drying and/or calcination steps are preferably performed after each step of providing a washcoat layer onto the substrate or of providing a second or further washcoat layer onto the catalyst.

Thus, the present invention also relates to a method for producing a catalyst comprising the steps of:
(i) providing a substrate;
(ii) impregnating one or more particulate support materials with at least one Pt- and/or at least one Pd-source, preferably with both a Pt- and a Pd-source, wherein the impregnation is preferably achieved by incipient wetness;
(iii) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (ii) to obtain a slurry, preferably by admixing the resulting mixture;
(iv) milling the slurry obtained in step (iii), preferably to a particle size d90 of 50 µm or less, more preferably of 30 µm or less, more preferably of 20 µm or less, and even more preferably of 10 µm or less;
(v) providing the resulting slurry of step (iv) onto the substrate in one or more coating steps as a layer, preferably as a washcoat layer;
(vi) optionally repeating steps (ii) to (v) one or more times, preferably once;
(vii) impregnating one or more particulate support materials with at least one Pt-source, wherein the impregnation is preferably achieved by incipient wetness;
(viii) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (vii) to obtain a slurry, preferably by admixing the resulting mixture;
(ix) milling the slurry obtained in step (viii), preferably to a particle size d90 of 50 µm or less, more preferably of 30 µm or less, more preferably of 20 µm or less, and even more preferably of 10 µm or less;
(x) providing the resulting slurry of step (ix) onto the coated substrate in one or more coating steps as a layer, preferably as a washcoat layer;
wherein a step of drying and/or a calcination step is preferably conducted after step (v) and/or step (x), more preferably a step of drying followed by a calcination step, wherein even more preferably a step of drying and/or a calcination step, preferably a step of drying followed by a calcination step, is conducted after step (v) and step (x),
wherein the total amount of alkali and alkaline earth metals comprised in the one or more nitrogen oxide storage materials contained in the catalyst ranges from 0.18 to 2.5 $g/in^3$ calculated as the respective alkali metal oxides $M_2O$ and alkaline earth metal oxides MO, preferably from 0.2 to 2.0 $g/in^3$, more preferably from 0.4 to 1.5 $g/in^3$, more preferably from 0.5 to 1.3 $g/in^3$, and even more preferably from 0.6 to 1.2 $g/in^3$, and wherein in the resulting catalyst the layer provided in step (x) preferably contains less than 500 ppm of Ba, and more preferably less than 500 ppm of nitrogen oxide storage material.

According to preferred embodiments of the inventive process, the catalyst layer provided in step (x) contains less than less than 50 ppm, more preferably less than 10 ppm, more preferably less than 1 ppm, and even more preferably less than 0.1 ppm of Ba.

Within the meaning of the present invention, the term "impregnated" refers to the result of a process, wherein a solution containing one or more components, and in particular containing Pt and/or Pd, is put into the pores of a given support material, and in particular of a particulate support material. In preferred embodiments, impregnation of said components is achieved by incipient wetness, wherein for example a volume of diluted Pt- and/or Pd-containing solution is approximately equal to the pore volume of the support bodies. Incipient wetness impregnation generally leads to a substantially uniform distribution of the solution of the one or more components throughout the pore system of the support.

According to further embodiments of the present invention which are preferred, the catalyst is obtained or obtainable according to the inventive method for producing a catalyst, and in particular, for producing a catalyst according to the embodiments and preferred embodiments of the catalyst according to the present invention. Thus, according to the present invention, the method for producing a catalyst is preferably a method for producing a catalyst, wherein the catalyst is a catalyst according to the embodiments and preferred embodiments of the present invention.

In addition to these embodiments, the present invention also relates to a method for the treatment of a nitrogen oxide containing gas stream using the catalyst of the present invention. More specifically, the method of the present invention includes conducting a nitrogen oxide gas stream over and/or through the inventive catalyst. According to preferred embodiments of the inventive method, the gas stream is preferably an exhaust gas stream resulting from an internal combustion engine, and more preferably from a gasoline engine, wherein more preferably the exhaust gas results from combustion in a lean burn gasoline engine, and even more preferably in a gasoline direct injection engine.

Thus, the present invention also concerns a process for the treatment of a gas stream comprising nitrogen oxide comprising conducting said gas stream over and/or through a catalyst according to the present invention, wherein the gas stream is preferably an exhaust gas stream resulting from an internal combustion engine, more preferably from a gasoline engine, more preferably from a lean burn gasoline engine, and even more preferably from a gasoline direct injection engine.

Finally, the present invention also relates to the use of the inventive catalyst as an oxidation precatalyst, in particular for the oxidation of hydrocarbons and/or nitrogen oxide, and preferably for the oxidation of both hydrocarbons and nitrogen oxide. According to the present invention, the catalyst is preferably used for the treatment of automotive exhaust gas, and more preferably for the treatment of gasoline engine exhaust gas, wherein even more preferably it is used for the treatment of exhaust gas from a lean burn gasoline engine, preferably from a gasoline direct injection engine.

The present invention includes the following embodiments, wherein these include the specific combinations of embodiments as indicated by the respective interdependencies defined therein:

1. A catalyst comprising a substrate and a catalyst coating, the catalyst coating comprising two or more layers, said layers comprising:
   (a) a first layer provided on the substrate, said first layer comprising Pt and/or Pd, preferably Pt and Pd; and
   (b) a second layer provided on the first layer, said second layer comprising Pt; the first and second layers each further comprising:
   one or more particulate support materials, wherein preferably at least part of the one or more platinum group metals is supported on the one or more particulate support materials;
   one or more oxygen storage component (OSC) materials; and
   one or more nitrogen oxide storage materials comprising one or more elements selected from the group of alkali and/or alkaline earth metals,
   wherein the total amount of alkali and alkaline earth metals comprised in the one or more nitrogen oxide storage materials contained in the catalyst ranges from 0.18 to 2.5 $g/in^3$ calculated as the respective alkali metal oxides $M_2O$ and alkaline earth metal oxides MO, preferably from 0.2 to 2.0 $g/in^3$, more preferably from 0.4 to 1.5 $g/in^3$, more preferably from 0.5 to 1.3 $g/in^3$, and even more preferably from 0.6 to 1.2 $g/in^3$.

2. The catalyst of embodiment 1, wherein the second layer contains less than 500 ppm of Ba, and preferably less than 500 ppm of nitrogen oxide storage material.

3. The catalyst of embodiment 1 or 2, wherein the first layer comprises less than 500 ppm of Rh, more preferably less than 500 ppm of further platinum group metal besides Pt and/or Pd, preferably Pt and Pd,
   and/or, preferably and,
   wherein the second layer comprises less than 500 ppm of Rh, more preferably less than 500 ppm of Rh and Pd, more preferably less than 500 ppm of further platinum group metal besides Pt.

4. The catalyst of any of embodiments 1 to 3, wherein the one or more particulate support materials comprise metal oxide support particles, said metal oxide support particles preferably comprising at least one compound selected from the group consisting of alumina, titania, titania-alumina, zirconia-alumina, baria-alumina, ceria-alumina, baria-ceria-alumina, lanthana-alumina, lanthana-zirconia-alumina, titania-zirconia, and mixtures thereof, more preferably at least one compound selected from the group consisting of alumina, zirconia-alumina, lanthana-alumina, lanthana-zirconia-alumina, and mixtures thereof, more preferably at least one compound selected from the group consisting of zirconia-alumina, lanthana-alumina, lanthana-zirconia-alumina, and mixtures thereof, wherein even more preferably the one or more particulate support materials comprise lanthana-zirconia-alumina.

5. The catalyst of any of embodiments 1 to 4, wherein the one or more OSC materials contained in the catalyst comprise one or more compounds selected from the group consisting of zirconia, ceria, lanthana, praseodymia, neodymia, and mixtures thereof,
   wherein the one or more OSC materials preferably comprise ceria and/or zirconia, more preferably ceria and zirconia, wherein ceria is preferably doped with La and/or Zr, more preferably with both La and Zr,
   wherein more preferably ceria doped with La and/or Zr, preferably La and Zr, is comprised in the second layer.

6. The catalyst of any of embodiments 1 to 5, wherein the alkaline and/or alkaline earth metals contained in the catalyst are selected from the group consisting of Li, Na, K, Rb, Cs, Mg, Ca, Sr, and Ba, preferably from the group consisting of K, Mg, Sr, and Ba, more preferably from the group consisting of K, Mg, and Ba, wherein more preferably the one or more nitrogen oxide storage materials comprise Mg and/or Ba, even more preferably Ba.

7. The catalyst of any of embodiments 1 to 6, wherein the alkaline and/or alkaline earth metals contained in the catalyst are comprised in the one or more oxygen storage materials as their respective carbonates and/or oxides.

8. The catalyst of any of embodiments 1 to 7, wherein the catalyst coating comprises Pt and Pd in a Pt:Pd weight ratio comprised in the range of from 1:10 to 100:1, more preferably of from 1:5 to 70:1, more preferably of from 1:2 to 50:1, more preferably of from 1:1 to 30:1, more preferably of from 2:1 to 20:1, more preferably of from 5:1 to 15:1, and even more preferably of from 6:1 to 11:1.

9. The catalyst of any of embodiments 1 to 8, wherein the catalyst comprises Pt in a loading of from 5 to 180 $g/ft^3$, preferable of from 10 to 140 $g/ft^3$, more preferably of from 30 to 120 $g/ft^3$, more preferably of from 45 to 110 $g/ft^3$, and even more preferably of from 55 to 105 $g/ft^3$.

10. The catalyst of any of embodiments 1 to 9, wherein the catalyst comprises Pd in a loading of from 0.5 to 18 $g/ft^3$, preferable of from 1 to 14 $g/ft^3$, more preferably of from 3 to 12 $g/ft^3$, more preferably of from 4.5 to 11 $g/ft^3$, and even more preferably of from 5.5 to 10.5 $g/ft^3$.

11. The catalyst of any of embodiments 1 to 10, wherein Rh is contained in the catalyst in an amount of 30 $g/ft^3$ or less, preferably of 20 $g/ft^3$ or less, more preferably of 15 $g/ft^3$ or less, more preferably of 10 $g/ft^3$ or less, more preferably of 5 $g/ft^3$ or less, more preferably of 1 $g/ft^3$ or less, wherein even more preferably the catalyst contains less than 500 ppm of Rh.

12. The catalyst of any of embodiments 1 to 11, wherein the one or more nitrogen oxide storage materials contained in the catalyst comprise Ba in an amount ranging from 0.18 to 2.0 g/in$^3$ calculated as BaO, preferably from 0.20 to 1.5 g/in$^3$, more preferably from 0.23 to 1.3 g/in$^3$, more preferably from 0.25 to 1.0 g/in$^3$, more preferably from 0.27 to 0.80 g/in$^3$, and even more preferably from 0.28 to 0.72 g/in$^3$.

13. The catalyst of any of embodiments 1 to 12, wherein the catalyst coating comprises Pt and Ba in a weight ratio of platinum to barium calculated as Pt:BaO which ranges from 0.01 to 1.0, preferably from 0.05 to 0.5, more preferably from 0.10 to 0.3, more preferably from 0.15 to 0.25, and even more preferably from 0.17 to 0.21.

14. The catalyst of any of embodiments 1 to 13, wherein the first layer comprises two or more separate layers, said separate layers being provided on one another.

15. The catalyst of any of embodiments 1 to 14, wherein the catalyst is comprised in an exhaust gas treatment system comprising an internal combustion engine and an exhaust gas conduit in fluid communication with the internal combustion engine,
   wherein the catalyst is present in the exhaust gas conduit, and
   wherein the internal combustion engine is preferably a gasoline engine, and more preferably a gasoline direct injection engine.

16. The catalyst of embodiment 15, wherein the exhaust gas treatment system further contains a selective catalytic reduction (SCR) catalyst in the exhaust gas conduit, preferably a Cu-containing SCR catalyst, the SCR catalyst preferably being located downstream of the catalyst, wherein more preferably a means of feeding a reducing agent into the exhaust gas conduit is located between the catalyst and the SCR catalyst, said reducing agent preferably comprising ammonia and/or urea, more preferably ammonia.

17. A method for producing a catalyst, preferably for producing a catalyst according to any one of embodiments 1 to 14, comprising the steps of:
   (i) providing a substrate;
   (ii) impregnating one or more particulate support materials with at least one Pt- and/or at least one Pd-source, preferably with both a Pt- and a Pd-source, wherein the impregnation is preferably achieved by incipient wetness;
   (iii) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (ii) to obtain a slurry, preferably by admixing the resulting mixture;
   (iv) milling the slurry obtained in step (iii), preferably to a particle size d$_{90}$ of 50 μm or less, more preferably of 30 μm or less, more preferably of 20 μm or less, and even more preferably of 10 μm or less;
   (v) providing the resulting slurry of step (iv) onto the substrate in one or more coating steps as a layer, preferably as a washcoat layer;
   (vi) optionally repeating steps (ii) to (v) one or more times, preferably once;
   (vii) impregnating one or more particulate support materials with at least one Pt-source, wherein the impregnation is preferably achieved by incipient wetness;
   (viii) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (vii) to obtain a slurry, preferably by admixing the resulting mixture;
   (ix) milling the slurry obtained in step (viii), preferably to a particle size d$_{90}$ of 50 μm or less, more preferably of 30 μm or less, more preferably of 20 μm or less, and even more preferably of 10 μm or less;
   (x) providing the resulting slurry of step (ix) onto the coated substrate in one or more coating steps as a layer, preferably as a washcoat layer;
   wherein a step of drying and/or a calcination step is preferably conducted after step (v) and/or step (x), more preferably a step of drying followed by a calcination step, wherein even more preferably a step of drying and/or a calcination step, preferably a step of drying followed by a calcination step, is conducted after step (v) and step (x),
   wherein the total amount of alkali and alkaline earth metals comprised in the one or more nitrogen oxide storage materials contained in the catalyst ranges from 0.18 to 2.5 g/in$^3$ calculated as the respective alkali metal oxides M$_2$O and alkaline earth metal oxides MO, preferably from 0.2 to 2.0 g/in$^3$, more preferably from 0.4 to 1.5 g/in$^3$, more preferably from 0.5 to 1.3 g/in$^3$, and even more preferably from 0.6 to 1.2 g/in$^3$, and
   wherein in the resulting catalyst the layer provided in step (x) preferably contains less than 500 ppm of Ba, and more preferably less than 500 ppm of nitrogen oxide storage material.

18. A process for the treatment of a gas stream comprising nitrogen oxide comprising conducting said gas stream over and/or through a catalyst according to any one of embodiments 1 to 16, wherein the gas stream is preferably an exhaust gas stream resulting from an internal combustion engine, more preferably from a gasoline engine, more preferably from a lean burn gasoline engine, and even more preferably from a gasoline direct injection engine.

19. Use of a catalyst according to any one of embodiments 1 to 16, or of a catalyst obtained and/or obtainable according to embodiment 17, as an oxidation precatalyst, more preferably for the treatment of automotive exhaust gas, more preferably for the treatment of gasoline engine exhaust gas, and even more preferably for the treatment of exhaust gas from a lean burn gasoline engine, preferably from a gasoline direct injection engine.

EXAMPLES

Example 1

Inner Layer

Figure 1:
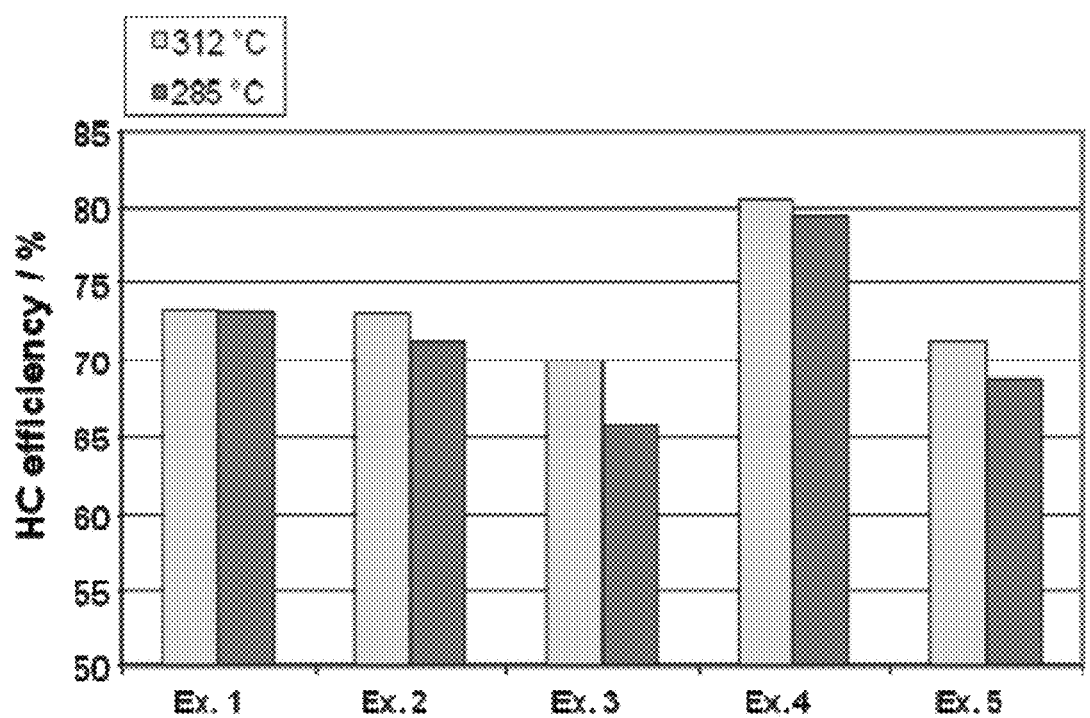
FIG. 1 displays results from testing of the catalysts of examples 1 to 5 with respect to the conversion of hydrocarbons emissions contained in automotive exhaust gas using a flame ionization detector. The values of "HC efficiency/%" indicate the percentage of the hydrocarbons originally contained in the automotive exhaust gas which have been converted after the exhaust has passed the catalyst according to said examples.
Figure 2:
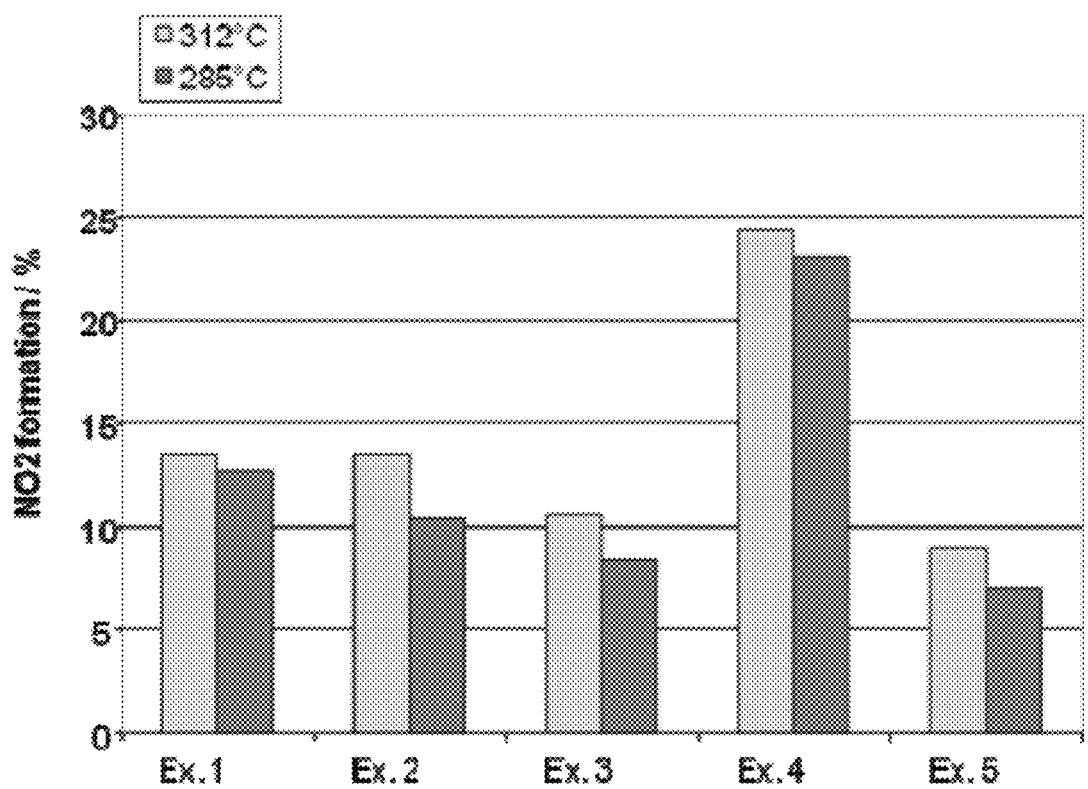
FIG. 2 displays results from testing of the catalysts of examples 1 to 5 with respect to the conversion of NO contained in automotive exhaust gas to NO$_2$ using a chemiluminescent detector. The values of "NO$_2$ formation/%" indicate the percentage of NO contained in the exhaust gas prior to passing the respective which has been converted to NO$_2$ after having passed the catalyst.

Platinum in the form of a platinum tetra methyl ammonium hydroxide complex solution was impregnated by planetary mixer (P-mixer) and subsequently palladium in the form of a palladium nitrate solution was impregnated onto a high surface area gamma alumina doped with 0.4% of lanthana and 15% zirconia to form a wet powder while achieving incipient wetness. The amounts of Pt and Pd where chosen to achieve a final concentration of 10 $g/ft^3$ of Pt and 2 $g/ft^3$ of Pd in the catalyst layer.

An aqueous slurry was then formed with water by combining the Pt and Pd loaded high surface area gamma alumina, cerium oxide, zirconium oxide, barium oxide, magnesium oxide and a binder, at concentrations of approximately 33%, 44%, 3%, 11.5%, 7%, and 1%, respectively, based on the calcined weight of the catalyst. The zirconium oxide was introduced as an acetate colloidal solution and the barium oxide as barium acetate solution. The resulting slurry was then milled to a particle size of 90% less than 10 microns.

The slurry was then coated onto a cordierite carrier to provide a first washcoat layer as the inner layer thereon. After coating, the carrier with the inner layer was dried, and then calcined at a temperature of 550° C. for 1 hour. The total loading of the inner layer was 2 $g/in^3$.

Middle Layer

Platinum in the form of a platinum tetra methyl ammonium hydroxide complex solution was impregnated by planetary mixer (P-mixer) and subsequently palladium in the form of a palladium nitrate solution was impregnated onto high surface area gamma alumina doped with 0.4% of lanthana and 15% zirconia to form a wet powder while achieving incipient wetness. The amounts of Pt and Pd where chosen to achieve a final concentration of 25 $g/ft^3$ of Pt and 4 $g/ft^3$ of Pd in the catalyst layer.

An aqueous slurry was formed with water by combining the Pt and Pd loaded high surface area gamma alumina, ceria, zirconium oxide, barium oxide, magnesium oxide and a binder, at concentrations of approximately 32%, 44%, 3%, 11.5%, 7%, and 1%, respectively, based on the calcined weight of the catalyst. The zirconium oxide was introduced as an acetate colloidal solution and the barium oxide as barium acetate solution. The resulting slurry was then milled to a particle size of 90% less than 10 microns.

The slurry was then coated onto the inner layer to provide a second washcoat layer as the middle layer thereon. After coating, the carrier with the inner and middle layers was dried, and then calcined at a temperature of 550° C. for 1 hour. The total loading of the middle layer was 2.3 $g/in^3$.

Outer Layer

Platinum in the form of a platinum tetra methyl ammonium hydroxide complex solution was impregnated by planetary mixer (P-mixer) onto high surface area gamma alumina doped with 0.4% of lanthana and 15% zirconia to form a wet powder while achieving incipient wetness. The amount of Pt was chosen to achieve a final concentration of 25 $g/ft^3$ of Pt in the catalyst layer.

An aqueous slurry was formed with water by combining the Pt loaded high surface area gamma alumina, ceria doped with 5% lanthanum and 5% zirconium, zirconium oxide, barium oxide, magnesium oxide and a binder, at concentrations of approximately 55%, 24%, 3%, 9%, 7%, and 1%, respectively, based on the calcined weight of the catalyst. The zirconium oxide was introduced as an acetate colloidal solution and the barium oxide as barium acetate solution. The resulting slurry was then milled to a particle size of 90% less than 10 microns.

The slurry was then coated onto the middle layer to provide a third washcoat layer as the outer layer of the catalyst. After coating, the carrier with the inner, middle and outer layers was dried, and then calcined at a temperature of 550° C. for 1 hour. The total loading of the outer layer was 2 $g/in^3$.

Example 2

Inner Layer

Platinum in the form of a platinum tetra methyl ammonium hydroxide complex solution was impregnated by planetary mixer (P-mixer) and subsequently palladium in the form of a palladium nitrate solution was impregnated onto a high surface area gamma alumina doped with 0.4% of lanthana and 15% zirconia to form a wet powder while achieving incipient wetness. The amounts of Pt and Pd where chosen to achieve a final concentration of 10 $g/ft^3$ of Pt and 2 $g/ft^3$ of Pd in the catalyst layer.

An aqueous slurry was then formed with water by combining the Pt and Pd loaded high surface area gamma alumina, cerium oxide, zirconium oxide, barium oxide, magnesium oxide and a binder, at concentrations of approximately 54%, 30%, 3%, 7%, 7%, and 1%, respectively, based on the calcined weight of the catalyst. The zirconium oxide was introduced as an acetate colloidal solution and the barium oxide as barium acetate solution. The resulting slurry was then milled to a particle size of 90% less than 10 microns.

The slurry was then coated onto a cordierite carrier to provide a first washcoat layer as the inner layer thereon. After coating, the carrier with the inner layer was dried, and then calcined at a temperature of 550° C. for 1 hour. The total loading of the inner layer was 2 $g/in^3$.

Middle Layer

Platinum in the form of a platinum tetra methyl ammonium hydroxide complex solution was impregnated by planetary mixer (P-mixer) and subsequently palladium in the form of a palladium nitrate solution was impregnated onto high surface area gamma alumina doped with 0.4% of lanthana and 15% zirconia to form a wet powder while achieving incipient wetness. The amounts of Pt and Pd where chosen to achieve a final concentration of 25 $g/ft^3$ of Pt and 4 $g/ft^3$ of Pd in the catalyst layer.

An aqueous slurry was formed with water by combining the Pt and Pd loaded high surface area gamma alumina, ceria, zirconium oxide, barium oxide, magnesium oxide and a binder, at concentrations of approximately 50%, 30%, 3%, 7%, 7%, and 1%, respectively, based on the calcined weight of the catalyst. The zirconium oxide was introduced as an acetate colloidal solution and the barium oxide as barium acetate solution. The resulting slurry was then milled to a particle size of 90% less than 10 microns.

The slurry was then coated onto the inner layer to provide a second washcoat layer as the middle layer thereon. After coating, the carrier with the inner and middle layers was dried, and then calcined at a temperature of 550° C. for 1 hour. The total loading of the middle layer was 2.3 g/in$^3$.

Outer Layer

Platinum in the form of a platinum tetra methyl ammonium hydroxide complex solution was impregnated by planetary mixer (P-mixer) and subsequently rhodium in the form of rhodium nitrate solution was impregnated onto high surface area gamma alumina doped with 0.4% of lanthana and 15% zirconia to form a wet powder while achieving incipient wetness. The amounts of Pt and Rh were chosen to achieve a final concentration of 25 g/ft$^3$ of Pt and 10 g/ft$^3$ of Rh in the catalyst layer.

An aqueous slurry was formed with water by combining the Pt and Rh loaded high surface area gamma alumina, ceria doped with 5% lanthanum and 5% zirconium, zirconium oxide, magnesium oxide and a binder, at concentrations of approximately 60%, 26%, 3%, 7%, and 1%, respectively, based on the calcined weight of the catalyst. The zirconium oxide was introduced as an acetate colloidal solution. The resulting slurry was then milled to a particle size of 90% less than 10 microns.

The slurry was then coated onto the middle layer to provide a third washcoat layer as the outer layer of the catalyst. After coating, the carrier with the inner, middle and outer layers was dried, and then calcined at a temperature of 550° C. for 1 hour. The total loading of the outer layer was 2 g/in$^3$.

Example 3

The catalyst of Example 3 was produced according to the procedure of Example 2, wherein for producing the inner layer, high surface area gamma alumina doped with 0.4% of lanthana and 15% zirconia was loaded with Pt and Pd to achieve a final concentration of 13 g/ft$^3$ of Pt and 3 g/ft$^3$ of Pd in the inner catalyst layer. The components present in the inner layer were Pt and Pd loaded high surface gamma alumina, cerium oxide, zirconium oxide, barium oxide, magnesium oxide and a binder, at concentrations of approximately 33%, 44%, 3%, 11.5%, 7%, and 1%, respectively, based on the calcined weight of the catalyst. The total loading of the inner layer was 2 g/in$^3$.

For producing the middle layer, high surface area gamma alumina doped with 0.4% of lanthana and 15% zirconia was loaded with Pt and Pd to achieve a final concentration of 31 g/ft$^3$ of Pt and 5 g/ft$^3$ of Pd in the middle catalyst layer. The components present in the middle layer were Pt and Pd loaded high surface gamma alumina, ceria, zirconium oxide, barium oxide, magnesium oxide and a binder, at concentrations of approximately 32%, 44%, 3%, 11.5%, 7%, and 1%, respectively, based on the calcined weight of the catalyst. The total loading of the middle layer was 2.2 g/in$^3$.

For producing the outer layer, high surface area gamma alumina doped with 0.4% of lanthana and 15% zirconia was loaded with Pt and Rh to achieve a final concentration of 31 g/ft$^3$ of Pt and 5 g/ft$^3$ of Rh in the outer catalyst layer. The components present in the outer layer were Pt and Rh loaded high surface gamma alumina, ceria doped with 5% lanthanum and 5% zirconium, zirconium oxide, magnesium oxide and a binder, at concentrations of approximately 60%, 26%, 3%, 7%, and 1%, respectively, based on the calcined weight of the catalyst. The total loading of the outer layer was 1.8 g/in$^3$.

Example 4

The catalyst of Example 4 was produced according to the procedure of Example 1, wherein for producing the inner layer, high surface area gamma alumina doped with 0.4% of lanthana and 15% zirconia was loaded with Pt and Pd to achieve a final concentration of 15 g/ft$^3$ of Pt and 3 g/ft$^3$ of Pd in the inner catalyst layer. The components present in the inner layer were Pt and Pd loaded high surface gamma alumina, cerium oxide, zirconium oxide, barium oxide, magnesium oxide and a binder, at concentrations of approximately 54%, 30%, 3%, 7%, 7%, and 1%, respectively, based on the calcined weight of the catalyst. The total loading of the inner layer was 2 g/in$^3$.

For producing the middle layer, high surface area gamma alumina doped with 0.4% of lanthana and 15% zirconia was loaded with Pt and Pd to achieve a final concentration of 42 g/ft$^3$ of Pt and 7 g/ft$^3$ of Pd in the middle catalyst layer. The components present in the middle layer were Pt and Pd loaded high surface gamma alumina, ceria, zirconium oxide, barium oxide, magnesium oxide and a binder, at concentrations of approximately 50%, 30%, 3%, 7%, 7%, and 1%, respectively, based on the calcined weight of the catalyst. The total loading of the middle layer was 2.3 g/in$^3$.

For producing the outer layer, high surface area gamma alumina doped with 0.4% of lanthana and 15% zirconia was loaded with Pt to achieve a final concentration of 42 g/ft$^3$ of Pt in the outer catalyst layer. The components present in the outer layer were Pt loaded high surface gamma alumina, ceria doped with 5% lanthanum and 5% zirconium, zirconium oxide, magnesium oxide and a binder, at concentrations of approximately 60%, 26%, 3%, 7%, and 1%, respectively, based on the calcined weight of the catalyst. The total loading of the outer layer was 2 g/in$^3$.

Example 5

Inner Layer

Platinum in the form of a platinum tetra methyl ammonium hydroxide complex solution was impregnated by planetary mixer (P-mixer) and subsequently palladium in the form of a palladium nitrate solution was impregnated onto a high surface area gamma alumina doped with 0.4% of lanthana and 15% zirconia to form a wet powder while achieving incipient wetness. The amounts of Pt and Pd where chosen to achieve a final concentration of 17 g/ft$^3$ of Pt and 3 g/ft$^3$ of Pd in the catalyst layer.

An aqueous slurry was then formed with water by combining the Pt and Pd loaded high surface area gamma alumina, cerium oxide, zirconium oxide, barium oxide, magnesium oxide and a binder, at concentrations of approximately 33%, 44%, 3%, 11.5%, 7%, and 1%, respectively, based on the calcined weight of the catalyst. The zirconium oxide was introduced as an acetate colloidal solution and the barium oxide as barium acetate solution. The resulting slurry was then milled to a particle size of 90% less than 10 microns.

The slurry was then coated onto a cordierite carrier to provide a first washcoat layer as the inner layer thereon. After coating, the carrier with the inner layer was dried, and then calcined at a temperature of 550° C. for 1 hour. The total loading of the inner layer was 2 g/in$^3$.

Middle Layer

Platinum in the form of a platinum tetra methyl ammonium hydroxide complex solution was impregnated by planetary mixer (P-mixer) and subsequently palladium in the form of a palladium nitrate solution was impregnated onto high surface area gamma alumina doped with 0.4% of lanthana and 15% zirconia to form a wet powder while achieving incipient wetness. The amounts of Pt and Pd where chosen to achieve a final concentration of 42 g/ft$^3$ of Pt and 7 g/ft$^3$ of Pd in the catalyst layer.

An aqueous slurry was formed with water by combining the Pt and Pd loaded high surface area gamma alumina, ceria, zirconium oxide, barium oxide, magnesium oxide and a binder, at concentrations of approximately 32%, 44%, 3%, 11.5%, 7%, and 1%, respectively, based on the calcined weight of the catalyst. The zirconium oxide was introduced as an acetate colloidal solution and the barium oxide as barium acetate solution. The resulting slurry was then milled to a particle size of 90% less than 10 microns.

The slurry was then coated onto the inner layer to provide a second washcoat layer as the middle layer thereon. After coating, the carrier with the inner and middle layers was dried, and then calcined at a temperature of 550° C. for 1 hour. The total loading of the middle layer was 2.3 g/in$^3$.

Outer Layer

Platinum in the form of a platinum tetra methyl ammonium hydroxide complex solution was impregnated by planetary mixer (P-mixer) and subsequently rhodium in the form of rhodium nitrate solution was impregnated onto high surface area gamma alumina doped with 0.4% of lanthana and 15% zirconia to form a wet powder while achieving incipient wetness. The amounts of Pt and Rh were chosen to achieve a final concentration of 42 g/ft$^3$ of Pt and 10 g/ft$^3$ of Rh in the catalyst layer.

An aqueous slurry was formed with water by combining the Pt and Rh loaded high surface area gamma alumina, ceria doped with 5% lanthanum and 5% zirconium, zirconium oxide, barium oxide, magnesium oxide and a binder, at concentrations of approximately 55%, 24%, 3%, 9%, 7%, and 1%, respectively, based on the calcined weight of the catalyst. The zirconium oxide was introduced as an acetate colloidal solution and the barium oxide as barium acetate solution. The resulting slurry was then milled to a particle size of 90% less than 10 microns.

The slurry was then coated onto the middle layer to provide a third washcoat layer as the outer layer of the catalyst. After coating, the carrier with the inner, middle and outer layers was dried, and then calcined at a temperature of 550° C. for 1 hour. The total loading of the outer layer was 2 g/in$^3$.

Example 6

The catalyst of Example 6 was produced according to the procedure of Example 5, wherein for producing the inner layer, high surface area gamma alumina doped with 0.4% of lanthana and 15% zirconia was loaded with Pt and Pd to achieve a final concentration of 12 g/ft$^3$ of Pt and 3 g/ft$^3$ of Pd in the inner catalyst layer. The components present in the inner layer were Pt and Pd loaded high surface gamma alumina, ceria doped with 5% lanthanum and 5% zirconium, zirconium oxide, barium oxide, magnesium oxide and a binder, at concentrations of approximately 33%, 45%, 3%, 12%, 7%, and 1%, respectively, based on the calcined weight of the catalyst. The total loading of the inner layer was 2.2 g/in$^3$.

For producing the middle layer, high surface area gamma alumina doped with 0.4% of lanthana and 15% zirconia was loaded with Pt and Pd to achieve a final concentration of 29 g/ft$^3$ of Pt and 7 g/ft$^3$ of Pd in the middle catalyst layer. The components present in the middle layer were Pt and Pd loaded high surface gamma alumina, ceria doped with 5% lanthanum and 5% zirconium, zirconium oxide, barium oxide, magnesium oxide and a binder, at concentrations of approximately 33%, 45%, 3%, 12%, 7%, and 1%, respectively, based on the calcined weight of the catalyst. The total loading of the middle layer was 2.2 g/in$^3$.

For producing the outer layer, high surface area gamma alumina doped with 0.4% of lanthana and 15% zirconia was loaded with Pt and Rh to achieve a final concentration of 29 g/ft$^3$ of Pt and 4 g/ft$^3$ of Rh in the outer catalyst layer. The components present in the outer layer were Pt and Rh loaded high surface gamma alumina, ceria doped with 5% lanthanum and 5% zirconium, zirconium oxide, barium oxide, magnesium oxide and a binder, at concentrations of approximately 46%, 34%, 3%, 9%, 7%, and 1%, respectively, based on the calcined weight of the catalyst. The total loading of the outer layer was 2 g/in$^3$.

Comparative Example 1

Inner Layer

An aqueous slurry was formed with water by combining high surface area gamma alumina, ceria-zirconia composite with 48 wt.-% ceria, zirconium oxide, cerium oxide, barium oxide, neodymium oxide and a binder, at concentrations of approximately 60%, 17%, 11%, 3% and 3%, respectively, based on the calcined weight of the catalyst. The zirconium oxide was introduced as an acetate colloidal solution, cerium as cerium nitrate and the barium oxide as barium acetate solution.

The slurry was then coated onto a cordierite carrier to provide a first washcoat layer as the inner layer thereon. After coating, the carrier with the inner layer was dried, and then calcined at a temperature of 550° C. for 1 hour. The total loading of the inner layer was 0.9 g/in$^3$.

Middle Layer

Platinum in the form of a platinum tetra methyl ammonium hydroxide complex solution was impregnated by planetary mixer (P-mixer) onto high surface area gamma alumina to form a wet powder while achieving incipient wetness. The amount of Pt was chosen to achieve a final concentration of 90 g/ft$^3$ Pt in the catalyst layer.

An aqueous slurry was formed with water by combining the Pt loaded high surface area gamma alumina, ceria-zirconia composite with 47 wt.-% ceria, zirconium oxide doped with 10 wt.-% lanthanum and zirconium oxide at concentrations of approximately 53%, 28%, 17% and 3%, respectively, based on the calcined weight of the catalyst. The zirconium oxide was introduced as an acetate colloidal solution. The resulting slurry was then milled to a particle size of 90% less than 10 microns.

The slurry was then coated onto the inner layer to provide a second washcoat layer as the middle layer thereon. After coating, the carrier with the inner and middle layers was dried, and then calcined at a temperature of 550° C. for 1 hour. The total loading of the middle layer was 1.8 g/in$^3$.

Outer Layer

Platinum in the form of a platinum tetra methyl ammonium hydroxide complex solution was impregnated by planetary mixer (P-mixer) and subsequently rhodium in the form of rhodium nitrate solution was impregnated onto high surface area gamma alumina to form a wet powder while achieving incipient wetness. The amounts of Pt and Rh were chosen to achieve a final concentration of 10 g/ft$^3$ of Pt and 10 g/ft$^3$ of Rh in the catalyst layer.

An aqueous slurry was formed with water by combining the Pt and Rh loaded high surface area gamma alumina, ceria-zirconia composite with 47 wt.-% ceria, zirconium oxide doped with 5 wt.-% cerium and 7% neodymium, zirconium oxide at concentrations of approximately 22%, 33%, 11% and 4%, respectively, based on the calcined weight of the catalyst. The zirconium oxide was introduced as an acetate colloidal solution and as zirconium hydroxide suspension. The resulting slurry was then milled to a particle size of 90% less than 10 microns.

The slurry was then coated onto the middle layer to provide a third washcoat layer as the outer layer of the catalyst. After coating, the carrier with the inner, middle and outer layers was dried, and then calcined at a temperature of 550° C. for 1 hour. The total loading of the outer layer was 0.9 g/in$^3$.

Test Description HC and NO Oxidation Efficiency:

Hydrocarbon oxidation and NO oxidation efficiencies of the catalysts obtained from examples 1 to 6 and comparative example 1 were tested at engine bench at 290° C. at lean exhaust gas conditions. To this effect, the catalysts produced in the examples and comparative examples were aged prior to testing for 25 h at 950° C. maximum catalyst bed temperature with secondary air injection. This procedure yields in intervals of 25 seconds at 950° C. bed temperature at lambda 1 and 8 seconds at lambda 2 with a minimum temperature at 650° C.

Afterwards the hydrocarbon oxidation was evaluated by setting the engine to operate at Lambda 2.5 at an exhaust gas flow of 41 m$^3$/h, 135 ppm hydrocarbon and an exhaust gas temperature at catalyst inlet of 290° C. To reach a catalyst temperature of 305-320° C., the engine load was increased and an exhaust gas flow of 50 m$^3$/h was established. The total hydrocarbon concentration was measured before and after the catalyst using a state of the art flame ionization detector. The amount of total hydrocarbons (THC) oxidized to CO$_2$ in percent was calculated as follows:

$$U_{THC} = \left(1 - \left(\frac{THC^{massoutlet}}{THC^{massinlet}}\right)\right) \cdot 100$$

Simultaneously, at this test the NO and NO$_2$ concentration was measured before and after the catalyst using a state of the art chemiluminescent detector. The NOx concentration in the exhaust gas at 290° C., a flow of 41 m$^3$/h and a lambda of 2.5 was 1030 ppm. The amount of NO$_2$ formed in percent was calculated as follows:

$$U = \frac{NO_2^{massoutlet}}{NO_x^{massinlet}} \cdot 100$$

The catalysts of examples 1 to 6 and comparative example 1 were tested as to the HC (hydrocarbon) oxidation efficiency and NO oxidation efficiency at different inlet temperatures, the results of which are displayed in FIGS. 1 to 4. In particular, the performance of the catalysts from examples 1 to 5 according to the present invention with respect to the HC and NO oxidation activities are respectively shown in FIGS. 1 and 2, the measurements having been performed at inlet temperatures of 285° C. and 312° C., respectively.

Figure 3:
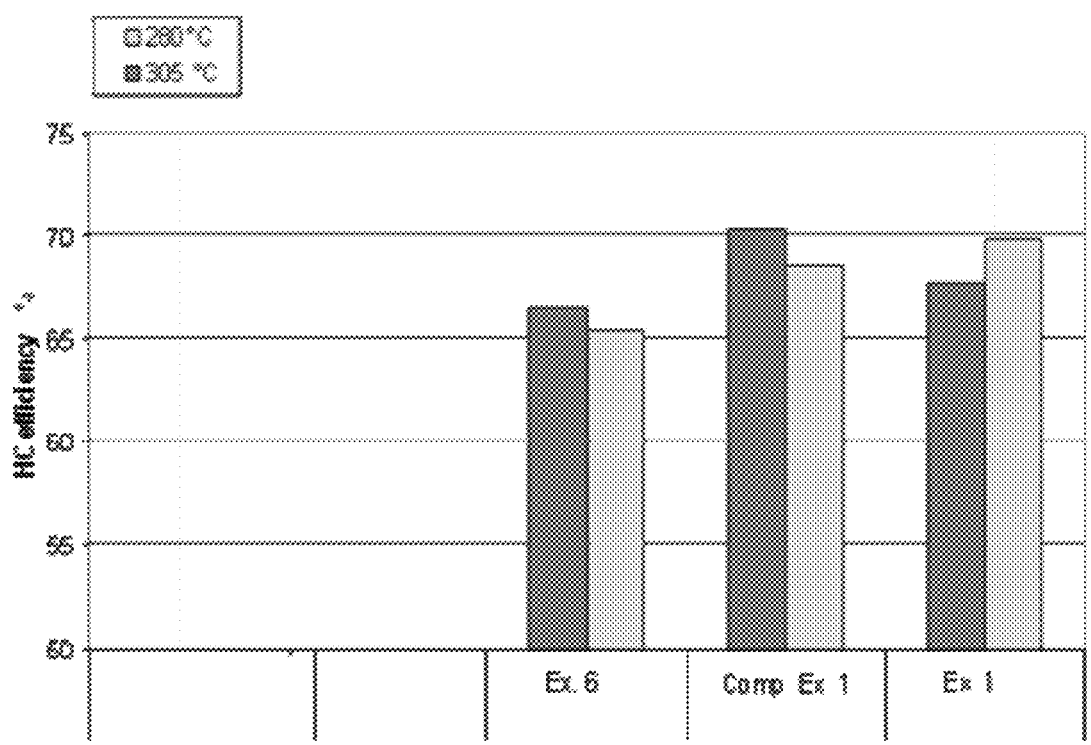
FIG. 3 displays results from testing of the catalysts of examples 1 and 6 and of comparative example 1, respectively, with respect to the conversion of hydrocarbons emissions contained in automotive exhaust gas. The values of "HC efficiency/%" have the same meaning as described above for FIG. 1.
Figure 4:
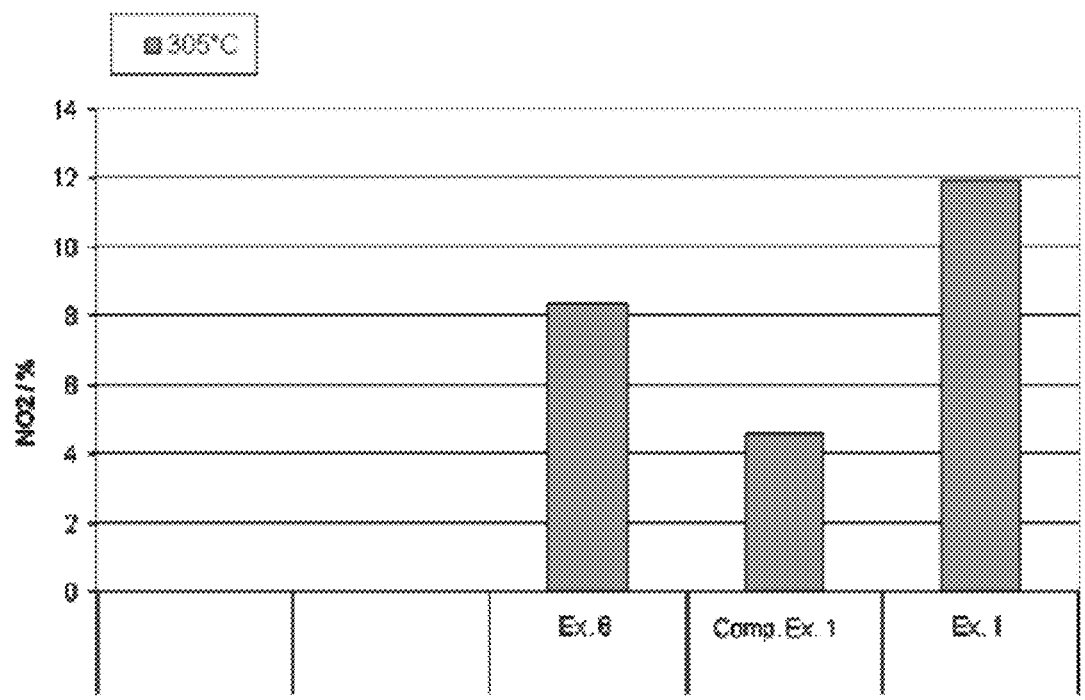
FIG. 4 displays results from testing of the catalysts of examples 1 and 6 and of comparative example 1, respectively, with respect to the conversion of NO contained in automotive exhaust gas to $NO_2$. The values of "NO2/%" have the same meaning as described above for FIG. 2.

FIGS. 3 and 4 display results from testing performed on the catalysts according to the present invention from examples 1 and 6, as well as on the catalyst obtained according to comparative example 1. The results for HC oxidation activity in FIG. 3 were obtained from testing at inlet temperatures of 280° C. and 305° C., respectively, whereas results for the NO oxidation performance displayed in FIG. 4 were obtained at an inlet temperature of 305° C. As may be taken from the test results in FIG. 3, the inventive catalysts according to examples 1 and 6 show an HC oxidation performance which is comparable to the catalyst of comparative example 1. However, as displayed in FIG. 4, the NO oxidation activity achieved by the inventive examples are clearly superior to the comparative example.

Accordingly, as has been demonstrated by the testing of the inventive catalysts of examples 1 to 6, in particular compared to the catalyst of comparative example 1, the catalysts of the present invention display an NO oxidation activity in the treatment of automotive exhaust gas which greatly surpasses the performance of a catalyst technology as may be found in the prior art. In particular, said exceptional feature is not achieved at the detriment of the HC oxidation activity, which nevertheless remains comparable to that achieved by the catalyst of comparative example 1.

The invention claimed is:

1. An oxidation catalyst for the oxidation of NO and hydrocarbons, the catalyst comprising a substrate and a catalyst coating, the catalyst coating comprising two or more layers, said layers comprising:
   (a) a first layer provided on the substrate, said first layer comprising Pt and/or Pd; and
   (b) a second layer provided on the first layer, said second layer comprising Pt;
the first and second layers each further comprising:
   one or more particulate support materials;
   one or more oxygen storage component (OSC) materials; and
   one or more nitrogen oxide storage materials comprising one or more elements selected from the group of alkali and/or alkaline earth metals,
wherein the total amount of alkali and alkaline earth metals comprised in the one or more nitrogen oxide storage materials contained in the catalyst ranges from 0.18 to 2.5 g/in$^3$ calculated as the respective alkali metal oxides M$_2$O and alkaline earth metal oxides MO,
wherein Rh is contained in the catalyst in an amount of 1 g/ft$^3$ or less.

2. The catalyst of claim 1, wherein at least part of the one or more platinum group metals is supported on the one or more particulate support materials.

3. The catalyst of claim 1, wherein the second layer contains less than 500 ppm of Ba.

4. The catalyst of claim 1, wherein the first layer comprises less than 500 ppm of Rh,
   and/or,
wherein the second layer comprises less than 500 ppm of Rh.

5. The catalyst of claim 1, wherein the one or more particulate support materials comprise metal oxide support particles.

6. The catalyst of claim 1, wherein the one or more OSC materials contained in the catalyst comprise one or more compounds selected from the group consisting of zirconia, ceria, lanthana, praseodymia, neodymia, and mixtures thereof.

7. The catalyst of claim 1, wherein the alkaline and/or alkaline earth metals contained in the catalyst are selected from the group consisting of Li, Na, K, Rb, Cs, Mg, Ca, Sr, and Ba.

8. The catalyst of claim 1, wherein the alkaline and/or alkaline earth metals contained in the catalyst are comprised in the one or more oxygen storage materials as their respective carbonates and/or oxides.

9. The catalyst of claim 1, wherein the catalyst coating comprises Pt and Pd in a Pt:Pd weight ratio comprised in the range of from 1:10 to 100:1.

10. The catalyst of claim 1, wherein the catalyst comprises Pt in a loading of from 5 to 180 $g/ft^3$.

11. The catalyst of claim 1, wherein the catalyst comprises Pd in a loading of from 0.5 to 18 $g/ft^3$.

12. The catalyst of claim 1, wherein Rh is contained in the catalyst in an amount of 500 ppm or less.

13. The catalyst of claim 1, wherein the one or more nitrogen oxide storage materials contained in the catalyst comprise Ba in an amount ranging from 0.18 to 2.0 $g/in^3$ calculated as BaO.

14. The catalyst of claim 1, wherein the catalyst coating comprises Pt and Ba in a weight ratio of platinum to barium calculated as Pt:BaO which ranges from 0.01 to 1.0.

15. The catalyst of claim 1, wherein the first layer comprises two or more separate layers, said separate layers being provided on one another.

16. The catalyst of claim 1, wherein the catalyst is comprised in an exhaust gas treatment system comprising an internal combustion engine and an exhaust gas conduit in fluid communication with the internal combustion engine, wherein the catalyst is present in the exhaust gas conduit.

17. The catalyst of claim 16, wherein the exhaust gas treatment system further contains a selective catalytic reduction (SCR) catalyst in the exhaust gas conduit.

18. A process for the treatment of a gas stream comprising nitrogen oxide comprising conducting said gas stream over and/or through a catalyst according to claim 1.

19. A method comprising a step of contacting one or more chemical with a catalyst according to claim 1, for catalyzing the oxidation of one or more of the chemical compounds.

20. A method for producing an oxidation catalyst for the oxidation of NO and hydrocarbons, the method comprising the steps of:
(i) providing a substrate;
(ii) impregnating one or more particulate support materials with at least one Pt- and/or at least one Pd-source;
(iii) adding one or more oxygen storage component (OSC) materials, one or more nitrogen oxide storage materials comprising one or more elements selected from the group of alkali and/or alkaline earth metals, and a solvent to the product obtained in step (ii) to obtain a slurry;
(iv) milling the slurry obtained in step (iii);
(v) providing the resulting slurry of step (iv) onto the substrate in one or more coating steps as a layer;
(vi) optionally repeating steps (ii) to (v) one or more times;
(vii) impregnating one or more particulate support materials with at least one Pt-source;
(viii) adding one or more oxygen storage component (OSC) materials, one or more nitrogen oxide storage materials comprising one or more elements selected from the group of alkali and/or alkaline earth metals, and a solvent to the product obtained in step (vii) to obtain a slurry;
(ix) milling the slurry obtained in step (viii);
(x) providing the resulting slurry of step (ix) onto the coated substrate in one or more coating steps as a layer;
wherein the total amount of alkali and alkaline earth metals comprised in the one or more nitrogen oxide storage materials contained in the catalyst ranges from 0.18 to 2.5 $g/in^3$ calculated as the respective alkali metal oxides $M_2O$ and alkaline earth metal oxides MO,
wherein Rh is contained in the catalyst in an amount of 1 $g/ft^3$ or less.

* * * * *